United States Patent
Hossain (10) Patent No.: US 11,926,283 B2
(45) Date of Patent: Mar. 12, 2024

(54) ACCELEROMETER WAKE-UP

(71) Applicant: Ford Global Technologies, LLC, Dearborn, MI (US)

(72) Inventor: Khalid Shamsuddin Hossain, Ottawa (CA)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 17/569,605

(22) Filed: Jan. 6, 2022

(65) Prior Publication Data

US 2023/0211751 A1    Jul. 6, 2023

(51) Int. Cl.
*B60R 25/10* (2013.01)
*B60R 25/32* (2013.01)
*B60R 25/40* (2013.01)

(52) U.S. Cl.
CPC .......... *B60R 25/1018* (2013.01); *B60R 25/32* (2013.01); *B60R 25/40* (2013.01)

(58) Field of Classification Search
CPC ...... B60R 25/1018; B60R 25/32; B60R 25/40
See application file for complete search history.

(56) References Cited

U.S. PATENT DOCUMENTS

| | | | |
|---|---|---|---|
| 5,809,439 A | 9/1998 | Damisch | |
| 7,548,161 B2 * | 6/2009 | Wehrenberg | G08B 25/008 340/407.1 |
| 10,058,290 B1 * | 8/2018 | Proud | A61B 5/749 |
| 10,698,462 B2 * | 6/2020 | Chen | G06F 1/3231 |
| 11,577,739 B1 * | 2/2023 | Walli | G07C 5/008 |
| 2005/0190059 A1 * | 9/2005 | Wehrenberg | G08B 25/008 340/686.1 |
| 2013/0041623 A1 | 2/2013 | Kumar et al. | |
| 2017/0343573 A1 * | 11/2017 | Lai | G01V 7/02 |
| 2020/0130454 A1 * | 4/2020 | Lundy | B60G 17/0155 |
| 2021/0190516 A1 | 6/2021 | Ventimiglia et al. | |
| 2021/0221312 A1 * | 7/2021 | Jenkins | G07C 5/008 |

\* cited by examiner

*Primary Examiner* — Jason Holloway
*Assistant Examiner* — Madison B Emmett
(74) *Attorney, Agent, or Firm* — Frank Lollo; Bejin Bieneman PLC (57) ABSTRACT

A system includes a first controller including a processor and a memory, and the memory stores instructions executable by the processor to receive first acceleration data from an accelerometer; upon determining that the first acceleration data satisfies a first criterion, transmit a wake-up instruction to a second controller; upon determining that the first acceleration data fails to satisfy the first criterion, instruct the accelerometer to send second acceleration data; and upon determining that the second acceleration data satisfies a second criterion, transmit the wake-up instruction to the second controller. The first criterion includes jerk exceeding a jerk threshold.

20 Claims, 4 Drawing Sheets

FIG. 6

ACCELEROMETER WAKE-UP

BACKGROUND

Accelerometers measure acceleration of a body compared to that body's rest state. Accelerometers generally include a proof mass connected to a spring and a way to measure the deflection of the proof mass, e.g., electrical, piezoelectric, piezoresistive, or capacitive. Accelerometers can be single-axis or multiple-axis.

DETAILED DESCRIPTION

When an ignition of an internal-combustion vehicle is turned off, the engine is not available to provide energy to systems of the vehicle. The ICE vehicle can include a low-voltage battery with a limited supply of energy to operate systems that run while the ignition is off. Likewise, when an ignition of an electric vehicle or hybrid vehicle is turned off, the high-voltage batteries used for propulsion are unavailable to provide energy to the systems of the vehicle. The electric vehicle can include a low-voltage battery with a limited supply of energy to operate systems that run while the ignition is off. For both ICE vehicles and electric vehicles, most systems of the vehicle are turned off along with the vehicle while some systems run using energy from the low-voltage battery after the vehicle is turned off.

The systems and techniques described herein can wake up systems of the vehicle while the vehicle is off in different types of situations indicating that something is happening to the vehicle while still minimizing false positives. In particular, a system can include an accelerometer and a first controller, and the first controller can be programmed to receive first acceleration data from the accelerometer; upon determining that the first acceleration data satisfies a first criterion, transmit a wake-up instruction to a second controller; upon determining that the first acceleration data fails to satisfy the first criterion, instruct the accelerometer to send second acceleration data; upon determining that the second acceleration data satisfies a second criterion, transmit the wake-up instruction to the second controller. The first criterion can include jerk exceeding a jerk threshold, which can indicate a sudden shock to the vehicle, e.g., from an impact. The second criterion can, e.g., include a sum of a plurality of acceleration measurements exceeding a threshold, which can indicate movement of the vehicle without a sudden shock, e.g., if the vehicle is being lifted or towed. The use of different criteria can capture both of these situations while not capturing other situations, e.g., situations for which the acceleration exceeds the threshold but not for a long enough duration for the second criterion. Avoiding such false positives can conserve the battery energy stored on board the vehicle by avoiding unnecessarily waking the second controller.

A system includes a first controller including a processor and a memory, and the memory stores instructions executable by the processor to receive first acceleration data from an accelerometer; upon determining that the first acceleration data satisfies a first criterion, transmit a wake-up instruction to a second controller, the first criterion including jerk exceeding a jerk threshold; upon determining that the first acceleration data fails to satisfy the first criterion, instruct the accelerometer to send second acceleration data; and upon determining that the second acceleration data satisfies a second criterion, transmit the wake-up instruction to the second controller.

The second criterion may be satisfiable with jerk failing to exceed the jerk threshold.

The second criterion may include a sum of a plurality of acceleration measurements exceeding a threshold. The instructions may further include instructions to receive the second acceleration data for a preset time, and the sum in the second criterion may be performed for the acceleration measurements over the preset time.

The instructions may further include instructions to, upon determining that the second acceleration data satisfies the first criterion, transmit the wake-up instruction to the second controller.

Instructing the accelerometer to send the second acceleration data may include instructing the accelerometer to disable a condition for entering a dormant state. The instructions may further include instructions to, upon receiving the second acceleration data, instruct the accelerometer to enable the condition for entering the dormant state.

The first criterion may include the jerk exceeding the jerk threshold for at least a preset number of time steps, the preset number being at least two.

The instructions may further include instructions to, after or concurrent with transmitting the wake-up instruction to the second controller, transmit at least one of the first acceleration data or the second acceleration data to the second controller.

The system may further include the second controller communicatively coupled to the first controller, and the second controller in an awake state may have a greater power draw than the first controller in an awake state.

The system may further include the second controller communicatively coupled to the first controller, and the second controller may be programmed to enter a dormant state in response to a vehicle ignition turning off.

The system may further include the accelerometer communicatively coupled to the first controller. The accelerometer may be programmed to transmit the first acceleration data to the first controller in response to the first acceleration data exceeding an acceleration threshold for at least a preset time.

The accelerometer may be programmed to enter a dormant state in response to current acceleration data being below an acceleration threshold for at least a preset time.

The accelerometer may include a first-in-first-out buffer, and the accelerometer may be programmed to store current acceleration data to the first-in-first-out buffer.

The accelerometer may be switchable between a dormant state and an awake state, the accelerometer in the dormant state may have insufficient power draw to transmit the first acceleration data to the first controller, and the accelerometer in the awake state may have sufficient power draw to transmit the first acceleration data to the first controller.

The accelerometer may be programmed to calibrate a zero value for acceleration in response to a vehicle ignition turning off.

The instructions may further include instructions to apply a low-pass filter to the first acceleration data before determining that the first acceleration data satisfies the first criterion.

The instructions may further include instructions to apply a low-pass filter to the second acceleration data before determining that the second acceleration data satisfies the second criterion.

A method includes receiving first acceleration data from an accelerometer; upon determining that the first acceleration data satisfies a first criterion, transmitting a wake-up instruction to a second controller, the first criterion including jerk exceeding a jerk threshold; upon determining that the first acceleration data fails to satisfy the first criterion, instructing the accelerometer to send second acceleration data; and upon determining that the second acceleration data satisfies a second criterion, transmitting the wake-up instruction to the second controller.

With reference to the Figures, wherein like numerals indicate like parts throughout the several views, a system 102 for a vehicle 100 includes a first controller 104 including a processor and a memory, and the memory stores instructions executable by the processor to receive first acceleration data from an accelerometer 106; upon determining that the first acceleration data satisfies a first criterion, transmit a wake-up instruction to a second controller 108; upon determining that the first acceleration data fails to satisfy the first criterion, instruct the accelerometer 106 to send second acceleration data; and upon determining that the second acceleration data satisfies a second criterion, transmit the wake-up instruction to the second controller 108. The first criterion includes jerk exceeding a jerk threshold.

Figure 1:
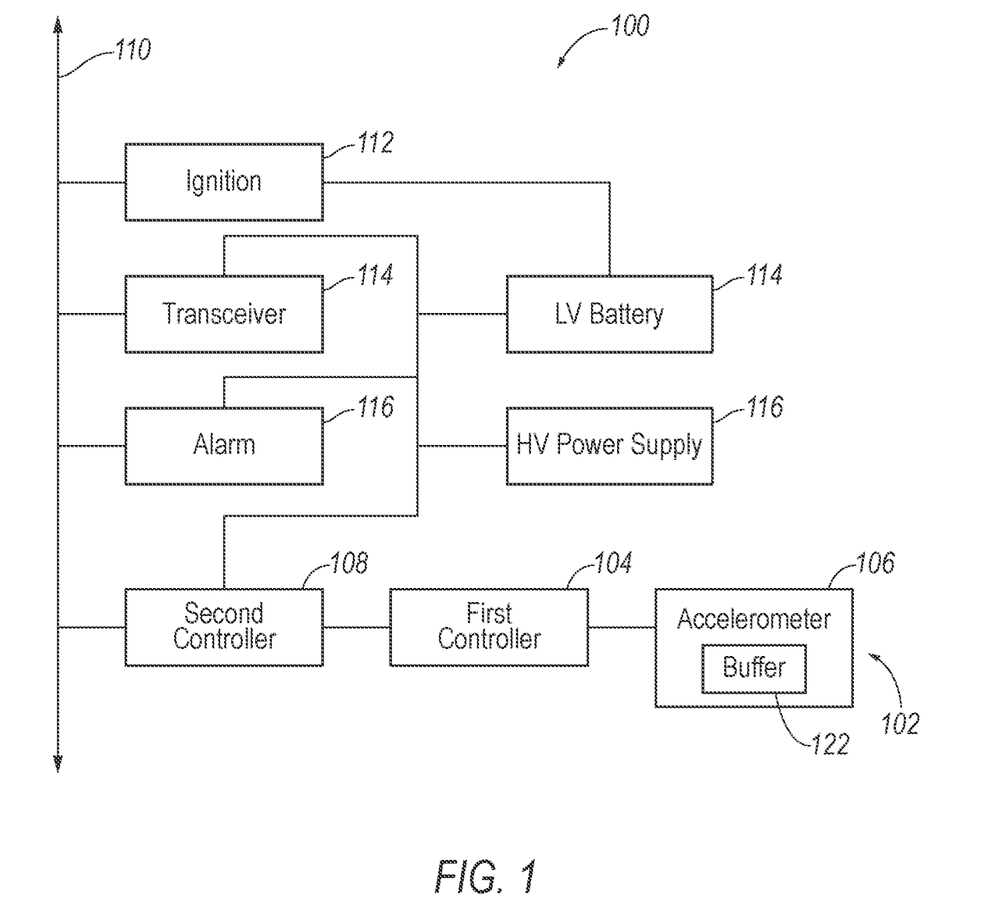
FIG. 1 is a block diagram of an example vehicle.

With reference to FIG. 1, the vehicle 100 may be any passenger or commercial automobile such as a car, a truck, a sport utility vehicle, a crossover, a van, a minivan, a taxi, a bus, etc.

The vehicle 100 can include a communications network 110 through which to transmit and receive data such as a controller area network (CAN) bus, Ethernet, WiFi, Local Interconnect Network (LIN), onboard diagnostics connector (OBD-II), and/or by any other wired or wireless communications network. The communications network 110 may communicatively couple the second controller 108, an ignition 112, a transceiver 114, an alarm 116, and other components.

The ignition 112 can be movable by the operator between, e.g., an off state, an on state, an accessories state, and a starting state. For example, the ignition 112 can be a barrel rotatable between positions corresponding to the states, or the ignition 112 can be a push button that is in the starting state when pressed. The ignition 112 can be biased to move out of the starting position, e.g., by having a spring that rotationally biases the barrel from the starting position to the on position or biases the button from the pressed position to the unpressed position. If the vehicle 100 has an internal-combustion engine, the ignition 112 can be electrically connected to a low-voltage battery 118 that is configured to supply power to a starter in response to a signal from the ignition 112. For example, when the ignition 112 is in the starting state, the ignition 112 can supply power from the low-voltage battery 118 to a solenoid, causing the solenoid to close and thereby complete a circuit for current to flow from the low-voltage battery 118 to the starter, which starts the engine (not shown). If the vehicle 100 is an electric vehicle, the ignition 112 can operate to connect the high-voltage batteries to a propulsion (not shown), e.g., by closing a switch.

The transceiver 114 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 114 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 114 may be one device or may include a separate transmitter and receiver.

The alarm 116 includes components for alerting people in the vicinity of the vehicle 100. For example, the alarm 116 can include a horn of the vehicle 100, exterior lamps of the vehicle 100 such as headlights, turn signals, and brake lights. When the alarm 116 is activated, the horn can honk, and the lamps can flash, thereby drawing attention to the vehicle 100.

The vehicle 100 includes the low-voltage battery 118. The low-voltage battery 118 may be of any suitable type for starting the vehicle 100 and powering always-on systems of the vehicle 100, for example, lithium-ion batteries, nickel-metal hydride batteries, lead-acid batteries, or ultracapacitors. The low-voltage battery 118 can be connected to an electrical bus(es) including the transceiver 114, the alarm 116, and the second controller 108.

The vehicle 100 includes a high-voltage power supply 120. The high-voltage power supply 120 can be, e.g., an internal-combustion engine and/or high-voltage batteries. The high-voltage batteries may be of any suitable type for vehicular electrification, for example, lithium-ion batteries, nickel-metal hydride batteries, lead-acid batteries, or ultra-capacitors, as used in, for example, plug-in hybrid electric vehicles (PHEVs), hybrid electric vehicles (HEVs), or battery electric vehicles (BEVs). The high-voltage power supply 120 can be connected to the electrical bus(es) including the transceiver 114, the alarm 116, and the second controller 108, e.g., via a DC/DC converter (not shown).

When the ignition 112 is in the on state, i.e., when the vehicle 100 is on, energy is supplied to the transceiver 114, the alarm 116, the second controller 108, and other vehicle systems from the high-voltage power supply 120. The transceiver 114, the alarm 116, the second controller 108, and the other vehicle systems are configured to remain on when the vehicle 100 is on. When the ignition 112 is in the accessories state, energy is supplied to the transceiver 114, the alarm 116, the second controller 108, and other vehicle systems only from the low-voltage battery 118 and not from the high-voltage power supply 120. The transceiver 114, the alarm 116, the second controller 108, and the other vehicle 100 systems 102 are configured to remain on when the ignition 112 is in the accessories state. When the ignition 112 is in the off state, i.e., when the vehicle 100 is off, energy is supplied to the transceiver 114, the alarm 116, the second controller 108, and other vehicle systems only from the low-voltage battery 118 and not from the high-voltage power supply 120. The transceiver 114, the alarm 116, the second controller 108, and the other vehicle 100 systems 102 are configured to be off by default when the ignition 112 is in the off state.

The system 102 includes the second controller 108, the first controller 104, and the accelerometer 106. The second controller 108 is communicatively coupled to the first controller 104. The accelerometer 106 is communicatively coupled to the first controller 104. The accelerometer 106 is not communicatively coupled to the second controller 108 other than via the first controller 104.

The second controller 108 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The second controller 108 can thus include a processor, a memory, etc. The memory of the second controller 108 can include media for storing instructions executable by the processor as well as for electronically storing data and/or databases, and/or the second controller 108 can include structures such as the foregoing by which programming is provided.

The first controller 104 is a microprocessor-based computing device, e.g., a generic computing device including a processor and a memory, an electronic controller or the like, a field-programmable gate array (FPGA), an application-specific integrated circuit (ASIC), a combination of the foregoing, etc. The first controller 104 can thus include a processor, a memory, etc. The memory of the first controller 104 can include media for storing instructions executable by the processor as well as for electronically storing data and/or databases, and/or the first controller 104 can include structures such as the foregoing by which programming is provided.

The accelerometer 106 measures acceleration of the vehicle 100 compared to a rest state of the vehicle 100. The accelerometer 106 can include a proof mass connected to a spring and a way to measure the deflection of the proof mass, e.g., electrical, piezoelectric, piezoresistive, or capacitive. The accelerometer 106 can be single-axis or multiple-axis.

The accelerometer 106 can be calibratable, e.g., so that acceleration due to gravity can be zeroed out. For example, the accelerometer 106 can be programmed to calibrate a zero value for acceleration in response to the ignition 112 turning off. If the accelerometer 106 is multiple-axis, calibrating the accelerometer 106 can account for the orientation of the vehicle 100.

The accelerometer 106 can include a buffer 122, e.g., a first-in-first-out (FIFO) buffer. The buffer 122 can store acceleration data as the acceleration data is measured by the sensing device of the accelerometer 106. For example, the buffer 122 can operate in one of two storage modes. In a single-FIFO mode, the buffer 122 can continuously store the acceleration data until the buffer 122 is full and then stop storing new acceleration data. In a stream-to-FIFO mode, the buffer 122 can continuously store the acceleration data to the buffer 122 until the acceleration data exceeds an acceleration threshold for at least a first preset time and then stop storing new acceleration data. The acceleration threshold and first preset time can be chosen to capture acceleration caused by lifting of the vehicle 100 and to not capture acceleration caused by wind. The accelerometer 106 can be programmed to switch the buffer 122 from one of the modes to the other of the modes upon receiving an instruction to do so, e.g., from the first controller 104.

Figure 2:
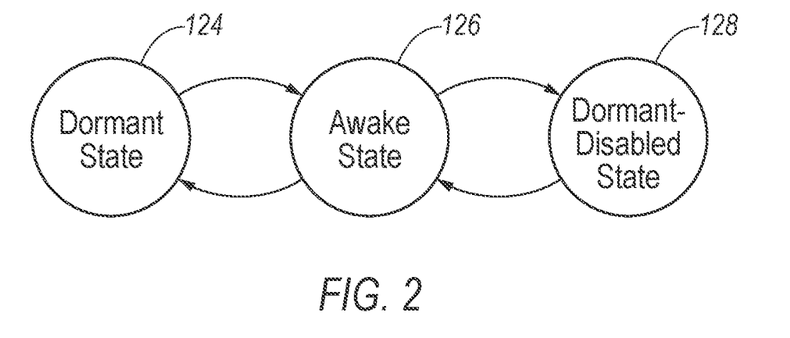
FIG. 2 is a network graph of example states of an accelerometer of the vehicle.

With reference to FIG. 2, the accelerometer 106 can be switchable between a dormant state 124, an awake state 126, and a dormant-disabled state 128.

The accelerometer 106 can be programmed to enter the dormant state 124 in response to current acceleration data being below the acceleration threshold for at least a second preset time. The second preset time can be chosen to be longer than a typical delay when lifting the vehicle 100. The accelerometer 106 in the dormant state 124 does not transmit acceleration data to the first controller 104. The accelerometer 106 in the dormant state 124 can have insufficient power draw to transmit the acceleration data to the first controller 104. The accelerometer 106 can be programmed to switch the buffer 122 to the stream-to-FIFO mode upon entering the dormant state 124.

The accelerometer 106 can be programmed to enter the awake state 126 in response to the first acceleration data exceeding the acceleration threshold for at least the first preset time. The accelerometer 106 in the awake state 126 can transmit acceleration data to the first controller 104. For example, the accelerometer 106 can be programmed to transmit the acceleration data already in the buffer 122 to the first controller 104 in response to entering the awake state 126. The accelerometer 106 can be programmed to switch the buffer 122 to the single-FIFO mode upon entering the awake state 126. The accelerometer 106 in the awake state 126 can have sufficient power draw to transmit acceleration data to the first controller 104.

The accelerometer 106 in the dormant-disabled state 128 can be programmed to behave the same as the accelerometer 106 in the awake state 126. The accelerometer 106 can be programmed to enter the dormant-disabled state 128 upon receiving an instruction from the first controller 104 to disable the condition for entering the dormant state, i.e., the acceleration data being below the acceleration threshold for at least the second preset time. The accelerometer 106 in the dormant-disabled state 128 does not switch to the dormant state even if the acceleration data is below the acceleration threshold for at least the second preset time.

Figure 3:
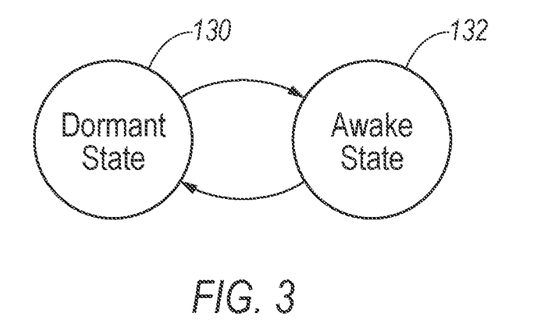
FIG. 3 is a network graph of example states of a first controller of the vehicle.

With reference to FIG. 3, the first controller 104 can be switchable between a dormant state 130 and an awake state 132.

The first controller 104 can be programmed to enter the dormant state 130 in response to the ignition 112 turning off, e.g., via an instruction from the second controller 108 triggered by the ignition 112 turning off. The first controller 104 can be programmed to enter the dormant state 130 upon transmitting data to the second controller 108 or upon determining that acceleration data does not satisfy either the first criterion or the second criterion, which are both described below. The first controller 104 in the dormant state 130 can be configured to not perform processing.

The first controller 104 can be programmed to enter the awake state 132 in response to the ignition 112 turning on, e.g., via an instruction from the second controller 108 triggered by the ignition 112 turning on. The first controller 104 can be programmed to enter the awake state 132 upon receiving acceleration data from the accelerometer 106. The first controller 104 in the awake state 132 can be configured to perform processing.

Figure 4:
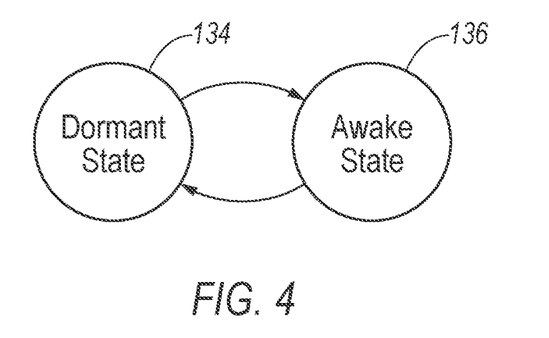
FIG. 4 is a network graph of example states of a second controller of the vehicle.

With reference to FIG. 4, the second controller 108 can be switchable between a dormant state 134 and an awake state 136.

The second controller 108 can be programmed to enter the dormant state 134 in response to the ignition 112 turning off. The second controller 108 in the dormant state 134 can be configured to not perform processing.

The second controller 108 can be programmed to enter the awake state 136 in response to receiving the wake-up instruction from the first controller 104. The second controller 108 in the awake state 136 can be configured to perform processing. The second controller 108 in the awake state 136 can have a greater power draw than the first controller 104 in the awake state 132. Thus, the system 102 can conserve energy by operating the first controller 104 to evaluate the acceleration data and only waking the second controller 108 upon the first or second criterion being satisfied.

The second controller 108 can be programmed to actuate one or more components of the vehicle 100 upon waking up in response to the wake-up instruction from the first controller 104. The component can be, e.g., the transceiver 114 and/or the alarm 116. For example, the second controller 108 can instruct the transceiver 114 to transmit a message to a remote server, e.g., a mobile phone associated with an owner or operator of the vehicle 100. For another example, the second controller 108 can instruct the alarm 116 to activate.

The first controller 104 can be programmed to transmit the wake-up instruction to the second controller 108 upon determining that acceleration data satisfies the first criterion. The first criterion can include jerk exceeding the jerk threshold, e.g., for at least a preset number of time steps. The preset number can be at least two, i.e., for multiple time steps. The jerk threshold and the preset number can be chosen to indicate an impact to the vehicle 100. The jerk can be determined by calculating a difference between the values of acceleration in consecutive time steps and dividing the difference by the time step, e.g.:

$$j(t) = \frac{a(t) - a(t-1)}{T_s}$$

in which j is the jerk, t is the time step, a is the acceleration, and $T_s$ is the duration of a time step. The first controller 104 can be programmed to count the time steps for which the jerk exceeds the jerk threshold, e.g., using a counting function:

$$c(t) = \begin{cases} 1 & |j(t)| > j_{th} \\ 0 & |j(t)| \le j_{th} \end{cases}$$

in which c is the counting function and $j_{th}$ is the jerk threshold. The computer can be programmed to sum the counting function over a preset duration and compare to the preset number, e.g.:

$$\sum_{i=1}^{N} c(t) > K$$

in which i is an index of the time steps, N is the number of time steps in the preset duration, and K is the preset number.

The preset duration can be chosen to be longer than an impulse from an impact to the vehicle 100, e.g., the length of the buffer 122.

The first controller 104 can be programmed to test new acceleration data against the second criterion in response to the acceleration data failing to satisfy the first criterion. For example, the first controller 104 can instruct the accelerometer 106 to enter the dormant-disabled state 128 and receive new acceleration data for a preset time. The preset time can be chosen to provide sufficient acceleration data to test the second criterion. The second criterion can be satisfiable with the jerk failing to exceed the jerk threshold; in other words, the second criterion can be satisfiable even when the first criterion is not satisfied.

The first controller 104 can be programmed to transmit the wake-up instruction to the second controller 108 upon determining that acceleration data satisfies the second criterion. The second criterion can include a sum of a plurality of acceleration measurements exceeding a threshold. The threshold can be chosen to indicate that the vehicle 100 is being lifted or towed or otherwise moved. The sum can be performed for the acceleration measurements over the preset time for which the first controller 104 receives the new acceleration data, e.g.:

$$\sum_{i=1}^{N} |a(t)| > A$$

in which i is an index of the time steps, N is the number of time steps in the preset time, and A is the threshold.

Figure 5:
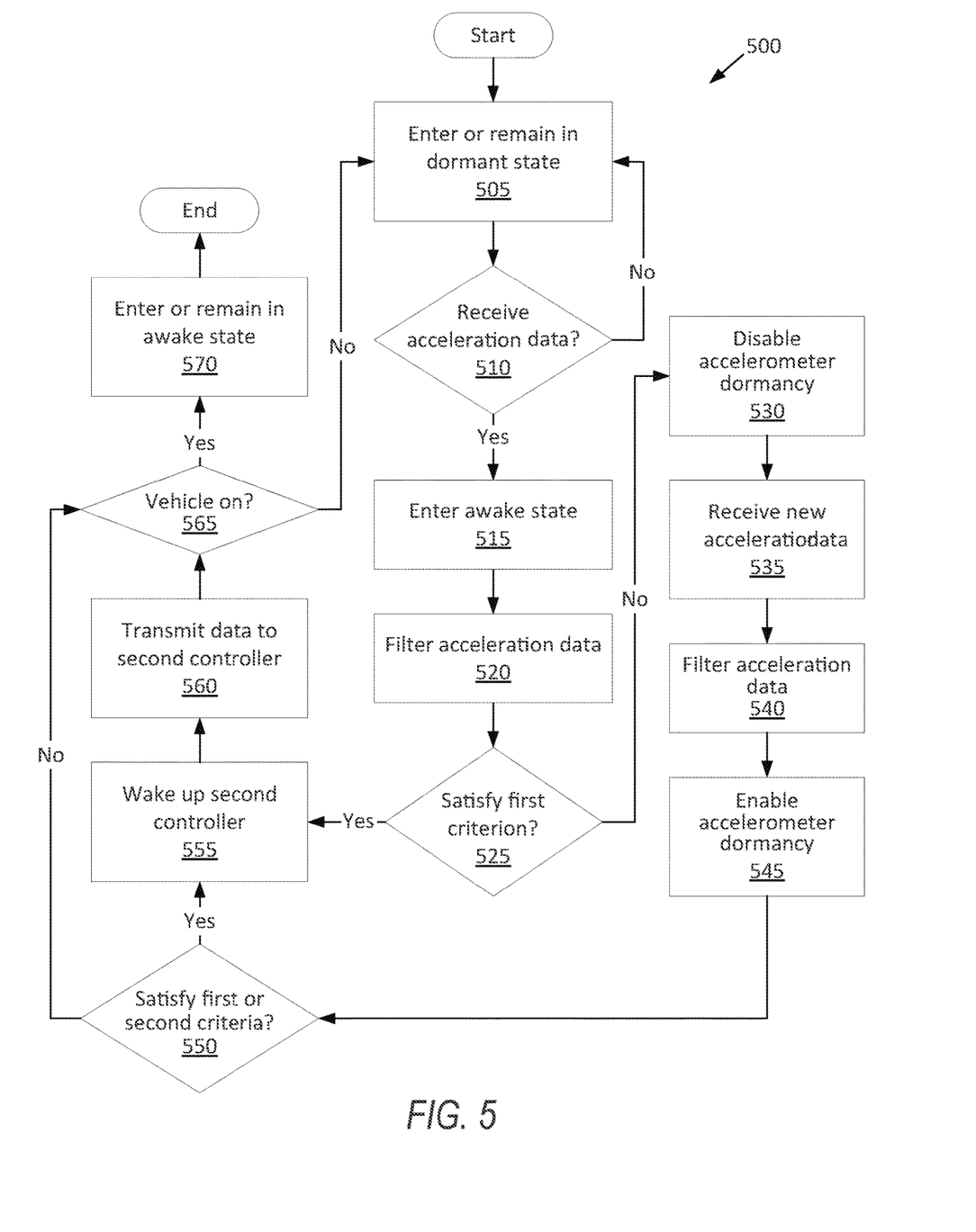
FIG. 5 is a process flow diagram of an example process for the first controller to wake up the second controller.

FIG. 5 is a process flow diagram illustrating an exemplary process 500 for the first controller 104 to wake up the second controller 108. The memory of the first controller 104 stores executable instructions for performing the steps of the process 500 and/or programming can be implemented in structures such as mentioned above. The process 500 begins in response to the vehicle 100 turning off. As a general overview of the process 500, the first controller 104 enters the dormant state 130 and wakes up upon receiving first acceleration data from the accelerometer 106. The first controller 104 filters the first acceleration data and determines whether the first acceleration data satisfies the first criterion. If not, the first controller 104 disables the dormancy of the accelerometer 106, receives second acceleration data from the accelerometer 106, filters the second acceleration data, re-enables the dormancy of the accelerometer 106, and determines whether the second acceleration data satisfies the first or second criterion. If the first or second criterion is satisfied, the first controller 104 transmits the wake-up instruction to the second controller 108 and transmits the first or second acceleration data to the second controller 108. The process 500 proceeds for as long as the vehicle 100 remains off, and the first controller 104 enters the awake state 132 in response to the vehicle 100 turning on.

The process 500 begins in a block 505, in which the first controller 104 enters or remains in the dormant state 130.

Next, in a decision block 510, the first controller 104 determines whether the first controller 104 has received the first acceleration data from the accelerometer 106. The first acceleration data will have been stored to the buffer 122 in the stream-to-FIFO mode by the accelerometer 106, and the accelerometer 106 will have switched from the dormant state 124 to the awake state 126. If the first controller 104 has not received the first acceleration data, the process 500 returns to the block 505 to remain in the dormant state 130. If the first controller 104 has received the first acceleration data, the process 500 proceeds to a block 515.

In the block 515, the first controller 104 enters the awake state 132, as described above.

Next, in a block 520, the first controller 104 applies a low-pass filter to the first acceleration data. The low-pass filter can prevent false positives from the first and second criteria without causing false negatives. Impulses from impacts that can be captured by the first criterion generally cause wide-band accelerations, i.e., that have both high and low frequencies, and the low frequencies are passed through the filter. Lifting or towing that can be captured by the second criterion generally causes accelerations having low frequencies, which are passed through the filter.

Next, in a decision block 525, the first controller 104 determines whether the first acceleration data satisfies the first criterion, as described above. Upon determining that the first acceleration data satisfies the first criterion, the process 500 proceeds to a block 555. Upon determining that the first acceleration data fails to satisfy the first criterion, the process 500 proceeds to a block 530.

In the block 530, the first controller 104 instructs the accelerometer 106 to measure and send the second acceleration data. This instruction can include instructing the accelerometer 106 to disable the condition for entering the dormant state. The accelerometer 106 thus enters the dormant-disabled state 128, and the buffer 122 is in the single-FIFO mode to store the second acceleration data.

Next, in a block 535, the first controller 104 receives the second acceleration data for the preset time, as described above.

Next, in a block 540, the first controller 104 applies the low-pass filter to the second acceleration data.

Next, in a block 545, the first controller 104 instructs the accelerometer 106 to enable the condition for entering the dormant state, which causes the accelerometer 106 to switch to the awake state 126.

Next, in a decision block 550, the first controller 104 determines whether the second acceleration data satisfies the first or second criterion, as described above. Upon determining that the second acceleration data satisfies the first criterion or the second criterion, the process 500 proceeds to the block 555. Upon determining that the second acceleration data fails to satisfy the first criterion and the second criterion, the process 500 proceeds to a decision block 565.

In the block 555, the first controller 104 transmits the wake-up instruction to the second controller 108, as described above.

Next, in a block 560, the first controller 104 transmits the first acceleration data (if the first acceleration data satisfied the first criterion) or the second acceleration data (if the second acceleration data satisfied the first or second criterion) to the second controller 108. The first controller 104 can transmit the acceleration data concurrent with transmitting the wake-up instruction, e.g., as a single message, i.e., the blocks 555 and 560 can be performed together. After the block 560, the process 500 proceeds to the decision block 565.

In the decision block 565, the first controller 104 determines whether the vehicle 100 has turned on, as described above. If so, the process 500 proceeds to a block 570. If not, the process 500 returns to the block 505 to continue waiting for new acceleration data.

In the block 570, the first controller 104 enters the awake state 132. After the block 570, the process 500 ends.

Figure 6:
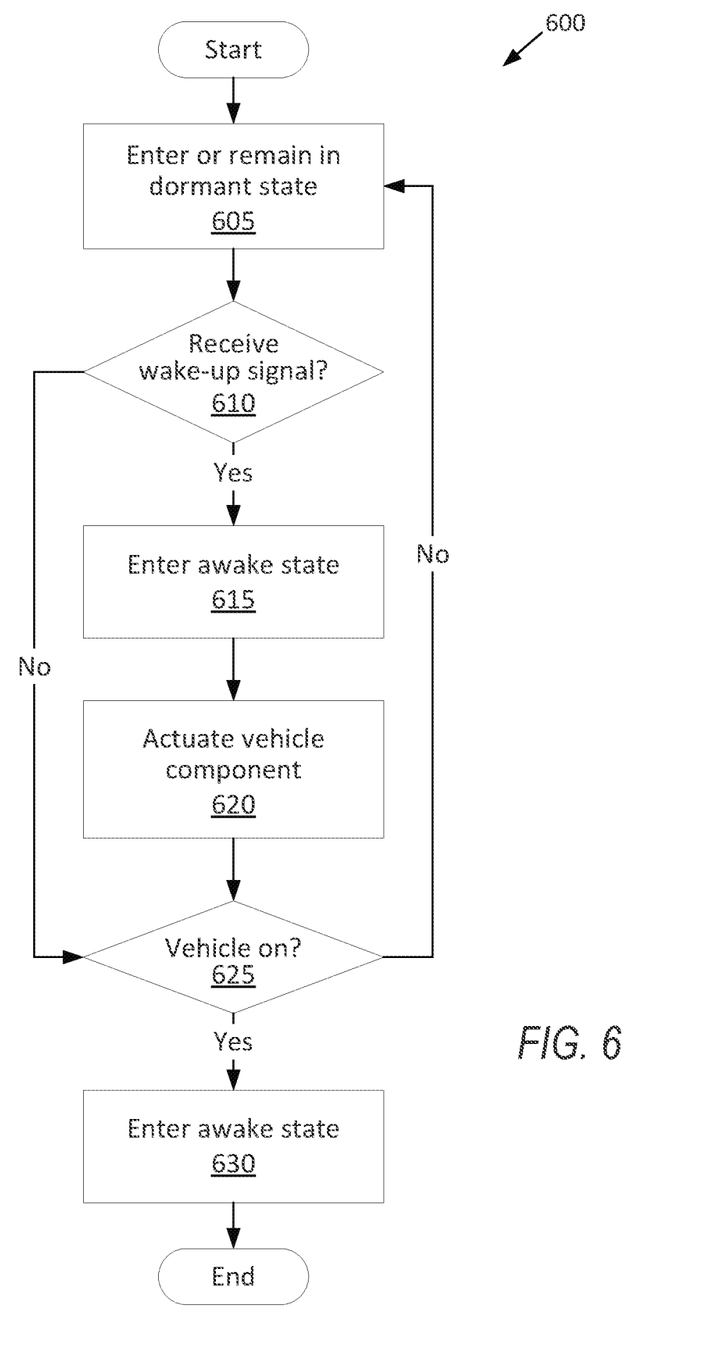
FIG. 6 is a process flow diagram of an example process for the second controller to wake up.

FIG. 6 is a process flow diagram illustrating an exemplary process 600 for the second controller 108 to wake up in response to the wake-up instruction from the first controller 104. The memory of the second controller 108 stores executable instructions for performing the steps of the process 600 and/or programming can be implemented in structures such as mentioned above. The process 600 begins in response to the vehicle 100 turning off. As a general overview of the process 600, the second controller 108 enters the dormant state 134 and wakes up in response to receiving the wake-up instruction from the first controller 104. The second controller 108 actuates a component of the vehicle 100. The process 600 proceeds for as long as the vehicle 100 remains off, and the second controller 108 enters the awake state 136 in response to the vehicle 100 turning on.

The process 600 begins in a block 605, in which the second controller 108 enters or remains in the dormant state 134.

Next, in a decision block 610, the second controller 108 determines whether the second controller 108 has received the wake-up instruction from the first controller 104. Upon receiving the wake-up instruction, the process 600 proceeds to a block 615. If the second controller 108 has not received the wake-up instruction, the process 600 proceeds to a decision block 625.

In the block 615, the second controller 108 enters the awake state 136, as described above.

Next, in a block 620, the second controller 108 actuates the component of the vehicle 100, e.g., the transceiver 114 and/or the alarm 116, as described above. After the block 620, the process 600 proceeds to the decision block 625.

In the decision block 625, the second controller 108 determines whether the vehicle 100 has turned on, as described above. If so, the process 600 proceeds to a block 630. If not, the process 600 returns to the block 605 to continue waiting for the wake-up instruction.

In the block 630, the second controller 108 enters the awake state 136. After the block 630, the process 600 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising a first controller including a processor and a memory, the memory storing instructions executable by the processor to:
   receive first acceleration data from an accelerometer;
   upon determining that the first acceleration data satisfies a first criterion, wake up a second controller, the first criterion including jerk exceeding a jerk threshold;
   upon determining that the first acceleration data fails to satisfy the first criterion, instruct the accelerometer to send second acceleration data; and
   upon determining that the second acceleration data satisfies a second criterion, wake up the second controller, the second criterion being different than the first criterion.

2. The system of claim 1, wherein the second criterion is satisfiable with jerk failing to exceed the jerk threshold.

3. The system of claim 1, wherein the second criterion includes a sum of a plurality of acceleration measurements exceeding a threshold.

4. The system of claim 3, wherein the instructions further include instructions to receive the second acceleration data for a preset time, and the sum in the second criterion is performed for the acceleration measurements over the preset time.

5. The system of claim 1, wherein the instructions further include instructions to, upon determining that the second acceleration data satisfies the first criterion, wake up the second controller.

6. The system of claim 1, wherein instructing the accelerometer to send the second acceleration data includes instructing the accelerometer to disable a condition for entering a dormant state.

7. The system of claim 6, wherein the instructions further include instructions to, upon receiving the second acceleration data, instruct the accelerometer to enable the condition for entering the dormant state.

8. The system of claim 1, wherein the first criterion includes the jerk exceeding the jerk threshold for at least a preset number of time steps, the preset number being at least two.

9. The system of claim 1, wherein the instructions further include instructions to, after or concurrent with waking up the second controller, transmit at least one of the first acceleration data or the second acceleration data to the second controller.

10. The system of claim 1, further comprising the second controller communicatively coupled to the first controller, wherein the second controller in an awake state has a greater power draw than the first controller in an awake state.

11. The system of claim 1, further comprising the second controller communicatively coupled to the first controller, wherein the second controller is programmed to enter a dormant state in response to a vehicle ignition turning off.

12. The system of claim 1, further comprising the accelerometer communicatively coupled to the first controller.

13. The system of claim 12, wherein the accelerometer is programmed to transmit the first acceleration data to the first controller in response to the first acceleration data exceeding an acceleration threshold for at least a preset time.

14. The system of claim 12, wherein the accelerometer is programmed to enter a dormant state in response to current acceleration data being below an acceleration threshold for at least a preset time.

15. The system of claim 12, wherein the accelerometer includes a first-in-first-out buffer, and the accelerometer is programmed to store current acceleration data to the first-in-first-out buffer.

16. The system of claim 12, wherein the accelerometer is switchable between a dormant state and an awake state, the accelerometer in the dormant state has insufficient power draw to transmit the first acceleration data to the first controller, and the accelerometer in the awake state has sufficient power draw to transmit the first acceleration data to the first controller.

17. The system of claim 12, wherein the accelerometer is programmed to calibrate a zero value for acceleration in response to a vehicle ignition turning off.

18. The system of claim 1, wherein the instructions further include instructions to apply a low-pass filter to the first acceleration data before determining that the first acceleration data satisfies the first criterion.

19. The system of claim 1, wherein the instructions further include instructions to apply a low-pass filter to the second acceleration data before determining that the second acceleration data satisfies the second criterion.

20. A method comprising:
receiving first acceleration data from an accelerometer;
upon determining that the first acceleration data satisfies a first criterion, waking up a second controller, the first criterion including jerk exceeding a jerk threshold;
upon determining that the first acceleration data fails to satisfy the first criterion, instructing the accelerometer, by a first controller, to send second acceleration data; and
upon determining that the second acceleration data satisfies a second criterion, waking up the second controller, the second criterion being different than the first criterion.

* * * * *